United States Patent
Iten et al.

(10) Patent No.: US 8,812,981 B1
(45) Date of Patent: Aug. 19, 2014

(54) METHODS AND APPARATUS TO CONDITIONALLY DISPLAY ICONS IN A USER INTERFACE

(71) Applicant: The DIRECTV Group, Inc., El Segundo, CA (US)

(72) Inventors: Tommi J. Iten, Redondo Beach, CA (US); Eric J. Bennett, Los Angeles, CA (US); Tyson L. Wintibaugh, Marina Del Rey, CA (US); David P. Green, Castaic, CA (US); Brian Black, Santa Monica, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/932,917

(22) Filed: Jul. 1, 2013

Related U.S. Application Data

(63) Continuation of application No. 12/343,914, filed on Dec. 24, 2008, now Pat. No. 8,499,256.

(51) Int. Cl.
*G06F 3/0482* (2013.01)

(52) U.S. Cl.
USPC ............................................ 715/810; 715/841

(58) Field of Classification Search
CPC ....................................................... G03F 3/048
USPC ..................................................... 715/841, 810
See application file for complete search history.

(56) References Cited

U.S. PATENT DOCUMENTS

| | | | |
|---|---|---|---|
| 2002/0176691 A1* | 11/2002 | Muguruma et al. | 386/83 |
| 2004/0070628 A1* | 4/2004 | Iten et al. | 345/810 |
| 2008/0276284 A1* | 11/2008 | Bumgardner et al. | 725/58 |

* cited by examiner

*Primary Examiner* — Andrea Leggett

(57) ABSTRACT

A method of conditionally displaying an icon to indicate a status within a user interface as part of a media presentation system is described. An example method includes updating a status of content within the media presentation system, displaying at least one icon within a guide menu containing one or more menu sections with each menu section containing a plurality of menu layers, and displaying the icon within a first menu layer to indicate the status of content within menu layers associated with the first menu layer.

22 Claims, 10 Drawing Sheets

METHODS AND APPARATUS TO CONDITIONALLY DISPLAY ICONS IN A USER INTERFACE

FIELD OF THE DISCLOSURE

The present disclosure relates generally to user interfaces and, more particularly, to methods and apparatus to distinguish elements of a user interface.

BACKGROUND

Media presentation systems may include a user interface having a program guide or tool to assist a user in parsing or searching through content (e.g., television programming or on-demand programs). Typically, such a program guide is implemented via an on-screen list or menu. The program guide may indicate what programs, movies, music, or other events are scheduled for broadcast at certain times or which programs are available for download. A user may manipulate such a program guide to determine upcoming or current programming by moving a cursor through the guide via a remote control or similar input device. Generally, the program guide enables a user to navigate through available and/or upcoming content and to select content for viewing, listening, and/or downloading.

SUMMARY

Methods and apparatus to conditionally display icons in a user interface are disclosed. An example method includes updating a status of content within a user interface as part of a media presentation system and displaying at least one icon within a guide menu containing one or more menu sections, with each menu section containing a plurality of menu layers. The example methods further includes displaying the icon within a first menu layer to indicate the status of content within menu layers associated with the first menu layer. An icon refers to any type(s) of user interface indication(s) including a static graphical image, an animated graphical image, an audio sound, a video image, and/or a combination of a graphical image with an audio sound. Additionally, content refers to any type(s) of media content, including, by way of illustration and not limitation, television programming, music, on-demand programming, pay-per-view programs, advertisement(s), game(s), on-demand lesson(s), instructional video(s), software update(s), etc.

DETAILED DESCRIPTION

Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

The example methods and apparatus described herein to distinguish elements of a user interface of a media presentation system (e.g., a home entertainment system including a media signal decoder and a television) may be implemented in connection with any type of media broadcasting system including, for example, satellite broadcast systems, cable broadcast systems, radio frequency wave broadcast systems, etc. By way of illustration, an example broadcast system is described below in connection with FIG. 1 and an example receiver (e.g., set-top-boxes, broadcast signal decoders, etc.) is described in detail below in connection with FIG. 2. Further, while the following description is made with respect to example DIRECTV® services and systems, it should be understood that many other delivery systems are readily applicable to the disclosed methods and apparatus. Such systems include wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), and fiber optic networks.

Figure 1:
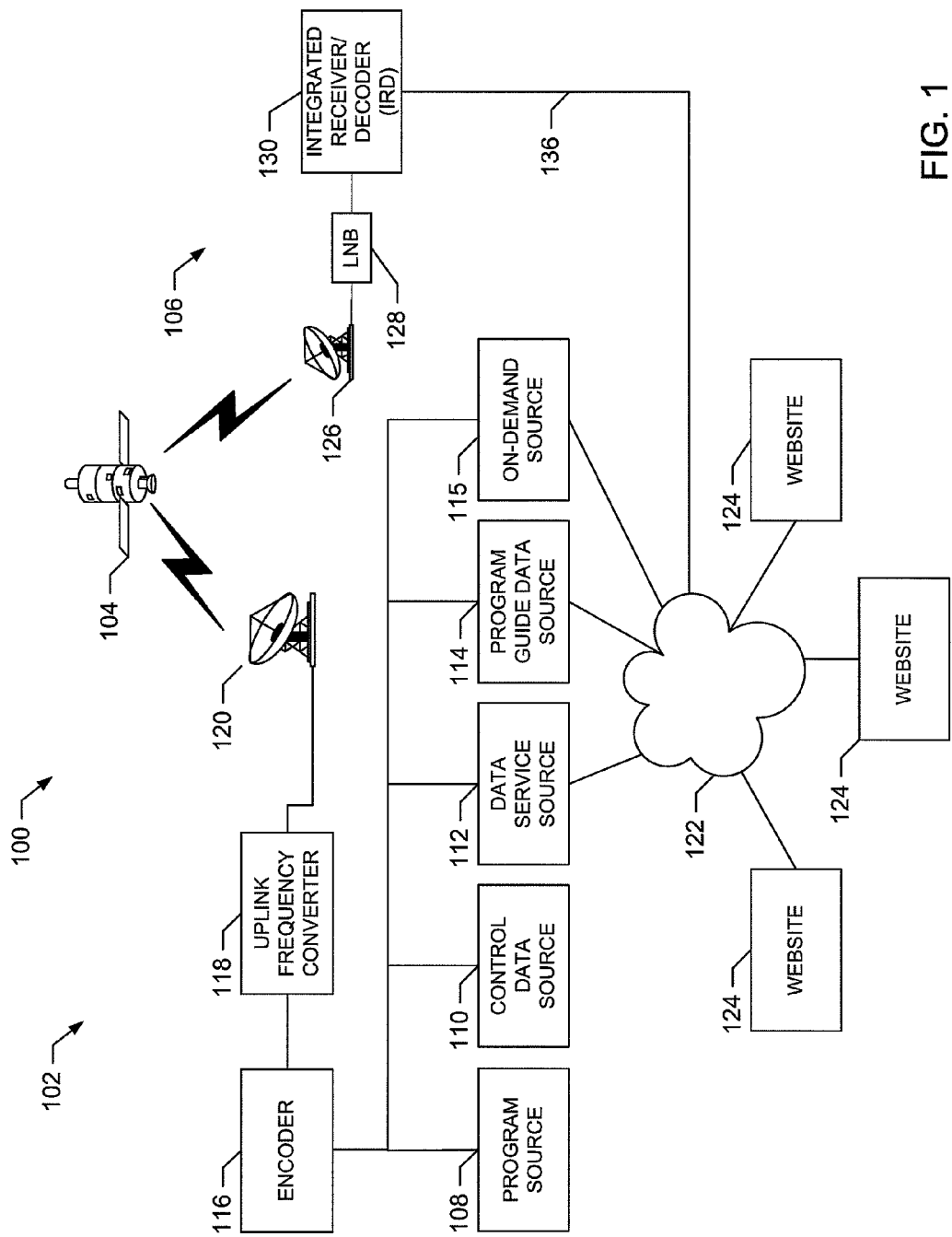
FIG. 1 is a diagram of an example direct-to-home (DTH) transmission and reception system.

As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136.

In further detail, the example transmission station 102 of the example system of FIG. 1 includes a plurality of sources of data and/or information (e.g., program sources 108, a control data source 110, a data service source 112, one or more program guide data sources 114, and an on-demand source 115). During operation, information from one or more of these sources 108-115 passes to an encoder 116, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. The receiver station 106 gathers the SCIDs related to the game, wherein the program guide data source 114 has previously provided to the receiver station 106 a list of SCIDs that correspond to the game. Such a program guide may be manipulated via an input device (e.g., a remote control). For example, a cursor may be moved to highlight a program description within the guide. A user may then select a highlighted program description via the input device to navigate to associated content (e.g., an information screen containing a summary of a television show episode) or activate an interactive feature (e.g., a program information screen, a recording process, a future showing list, etc.) associated with an entry of the program guide.

The on-demand (OD) source 115 receives data from a plurality of sources, including, for example, television broadcasting networks, cable networks, system administrators (e.g., providers of the DTH system 100), or other content distributors. Such content may include television programs, sporting events, movies, music, and corresponding information (e.g., user interface information for OD content) for each program or event. The content may be stored (e.g., on a server) at the transmission station 102 or locally (e.g., at a receiver station 106), and may be updated to include, for example, new episodes of television programs, recently released movies, and/or current advertisements for such content. Via a user interface, which also may be updated periodically, a user (e.g., a person with a subscription to an OD service) may request (i.e., demand) programming from the OD source 115. The system 100 may then stream the requested content to the user (e.g., over the satellite/relay 104 or the network 122) or make it available for download and storage (discussed further below in connection with FIG. 2). Thus, an OD service allows a user to view, download, and/or record selected programming at any time.

The satellite/relay 104 receives the modulated, encoded Ku-band bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to an integrated receiver/decoder (IRD) 130. The IRD 130 may be a set-top box, a personal computer (PC) having a receiver card installed therein, or any other suitable device.

The receiver station 106 may also incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite/relay 104. The signals are coupled from the reception antenna 126 to the LNB 128, which amplifies and, optionally, down converts the received signals. The LNB output is then provided to the IRD 130.

Figure 2:
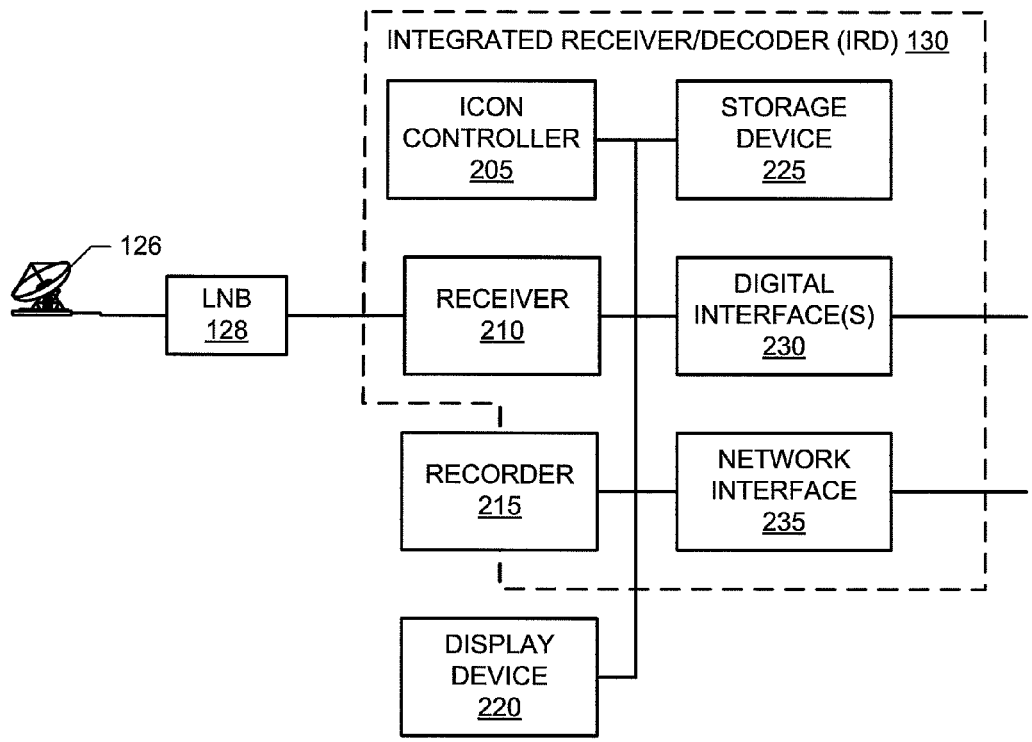
FIG. 2 illustrates an example manner of implementing the example integrated receiver/decoder (IRD) of FIG. 1.

FIG. 2 illustrates one example manner of implementing the IRD 130 (e.g., a set-top box) of FIG. 1. The IRD 130 of FIG. 2 is merely an example and other IRD implementations are possible. The LNB output is provided to a receiver 210, which receives, demodulates, de-packetizes, de-multiplexes, decrypts and/or decodes the received signal to provide audio and video signals to a display device 220 (e.g., a television set or computer monitor) and/or a recorder 215. The receiver 210 is responsive to user inputs to, for example, tune to a particular program.

As illustrated in FIG. 2, the recorder 215 may be implemented separately from and/or within the IRD 130. The recorder 215 may be, for example, a device capable of recording information on a storage device 225, for instance, analog media such as videotape, or computer readable digital media such as a hard disk drive, a digital versatile disc (DVD), a compact disc (CD), flash memory, and/or any other suitable media. The storage device 225 is used to store the packetized assets and/or programs received via the satellite/relay 104 (e.g., a movie requested from the OD source 115). In particular, the packets stored on the storage device 225 are the same encoded and, optionally, encrypted packets created by the transmission station 102 and transmitted via the satellite/relay 104.

To communicate with any of a variety of clients, media players, etc., the example IRD 130 includes one or more digital interfaces 230 (e.g., USB, serial port, Firewire, etc.). To communicatively couple the example IRD 130 to, for instance, the Internet and/or a home network, the example IRD 130 includes a network interface 235 that implements, for example, an Ethernet interface.

Further, the example IRD 130 includes an example icon controller 205 to manage and conditionally display icons within the user interface corresponding to changes in the status of content. The icons are an onscreen display used for notifying a user of a change on status of content stored on and/or associated with the IRD 130. For example, a user may specify the recorder 215 to record a plurality of programs. When a program is newly recorded, the icon controller 205 displays an icon in one or more menu layers to indicate a new program has been recorded and is ready for viewing. Additionally, the icon controller 205 may display icons outside and/or adjacent to menu layers such as, for example, displaying icons over live television video, in a channel banner, in an options menu, in a setup menu, and/or in a main menu. Furthermore, the icon controller 205 may display icons in a standby screen and/or graphic when the IRD 130 initiates a powered state.

The program may be saved in such a manner so that the icon is displayed in a hierarchical menu layer one or more menu layers above the menu layer where the program content is normally displayed. In the example described in detail below, a new episode of 'Top Chef' may be saved in a third menu layer containing episodes of the 'Top Chef' series. The third menu layer is part of a second menu layer including a listing of all the television series to be recorded. The second menu layer is part of a first menu layer of all content (e.g., movies, On-Demand content, series, single events, etc) to be recoded. In one example, all three menu layers are included in a menu section for displaying recorded content. The first menu layer is the menu layer displayed when the user opens and/or accesses the menu section for recorded content. As a result, when the user opens the menu section for recorded content, the new episode of 'Top Chef' is located two menu layers down from the menu section for recorded content.

Presently used menu sections within a user interfaces do not provide an indication of new content and/or a change in the status of the content within the highest menu layer and/or within the user interface. Thus, using conventional menu arrangements, it is possible that new content could be downloaded and expire after a time period without a user ever becoming aware of the new content because the new content is stored at a lower menu layer that is not routinely viewed by a user. In contrast, the example icon controller 205 described in the methods and apparatus disclosed herein displays an icon or other visual indication in the top menu layer indicating there is new content and/or a change in the status of content within one or more menu layers included in the top menu layer. As used herein, the terms 'program,' and 'content' refers to any type(s) of media content, including, by way of illustration and not limitation, television programming, music, on-demand programming, pay-per-view programs, advertisement(s), game(s), on-demand lesson(s), instructional video(s), etc. Additionally, the term 'icon' refers to any type(s) of user interface indication(s) including, for example, a static graphical image, an animated graphical image, an audio sound, a video image, and/or a combination of a graphical image with an audio sound.

The menu guide and/or user interface can be thought of as a collection of folders within a filing cabinet. Each folder may include one or more sub-folders and the sub-folders may include one or more sub-folders with each folder and/or sub-folder containing program content. The example icon controller 205 indicates the change in the status of a program and/or content by displaying a graphical image or icon on the tab of the folder and subsequent sub-folders within the folder containing the changed content. In an example, the same and/or a similar icon appears on the tab of the sub-folder with the new content directing the user to the menu location of the new content. Thus, a user can open the filing cabinet, locate the folder with the icon on the tab, and then locate the sub-folder and any additional sub-folders containing the icon until the user reaches the new content. Furthermore, the icon may be displayed on the exterior of the filing cabinet such that a user would know to open the filing cabinet and look for the folders and sub-folders with the same icon on their tabs. Within the user interface, the menu section is the filing cabinet, the first menu layer is the folder and the second and lower menu layers are the sub-folders. Additionally or alternatively, the icon may be displayed within the user interface window, within the television display, and/or within a program guide menu.

As explained in detail below, the graphic images, or icons, may correspond to content genre (e.g., sports, news, action movie, etc.), content source (e.g., VOD, recorded content, showcases, pay per view, etc.), content type (e.g., video, messages, programs, content provider information, software downloads, etc.), and/or user type. For example a USER 1 configures the IRD 130 to record a Set A of programs including television series, movies, Video On Demand (VOD), single events, etc. Additionally, a USER 2 configures the IRD 130 to record a Set B of programs which are different from the programs in Set A. Furthermore, a USER 3 and a USER 4 configure the IRD 130 to record respectively a Set C and a Set D of programs different from each other and different from the Set A and the Set B. The example icon controller 205 enables the USERS 1-4 to set the indication type for the programming in their respective Set. USER 1 may select a yellow star icon to indicate newly available content for programs listed in the Set A, USER 2 may select a blue box with a text of 'U2' to be displayed to indicate new content for programs listed in Set B, USER 3 may select a red triangle to indicate new content for programs listed in Set C, and USER 4 may select a green hexagon to indicate new content for programs listed in Set D. As a result, if the IRD 130 records a program listed in Set A, the icon controller 205 displays a yellow star in the menu layer containing the new content and the hierarchical menu layers associated with the menu layer with the new content. Thus, when any one of the USERS 1-4 view the program guide, the yellow star will be displayed on the associated menu layer indicating there is new content corresponding to programs listed in the Set A corresponding to USER 1. In addition to configuring icons to indicate new content, the USERS 1-4 may use the example icon controller 205 to configure icons to be displayed for program capacity limits, for programs to be deleted, etc.

In the example of FIG. 2, the example icon controller 205 may receive icons from the control data source 110 and/or the data service source 112. The icon controller 205 enables the service provider or a user to configure the conditions to display one or more icons the guide menu and/or the user interface. The icon controller 205 manages the display of the icons, the linkage of the icons to the corresponding content and/or a listing of the corresponding content, and the updating of the icons as the content is changed and/or as the conditions for displaying the icons change. Additionally, the icon controller 205 receives changes in the status of content from the IRD 130, the recorder 215, the network interface 235, and/or the storage device 225. Alternatively, the icons may be local and the icon controller 205 may associate icons with data. Furthermore, the example icon controller 205 provides control enabling a user to select and/or click on an icon opening the corresponding menu layer. The user may select an icon by engaging elements of a keypad (e.g., enter, up, down, left, and/or right arrows) on a remote control. For example, if a star icon displayed on a first menu layer indicates a new episode of 'Top Chef' has been recorded, a user can select the star icon and open the menu layer containing the new episode. Elements of one example of the icon controller 205 are described in further detail below in connection with FIG. 3.

The icons managed by the example icon controller 205 may include a graphical image such as, for example, a star, a check mark, a circle, a target, a picture, text, and/or an animation of one or more of the graphical images. The service provider may add, modify, and/or remove icons available to the icon controller 205. Control settings included in the example icon controller 205 enable one or more users to modify the settings of an icon such as the icon color, the icon shape, length of time to display the icon, the icon location in the guide menu and/or menu layers and/or the icon text in the case of a graphical icon or the icon tone and/or volume level in the case of an audio icon. The icon type may be selected and/or configured per user, content type, status type, etc. Additionally, a user or the service provider may change, add, remove, and/or modify the conditions to display an icon.

The conditions for the example icon controller 205 to display an icon include when there is new content in a menu layer that has not been viewed and/or viewed in its entirety, when there is content that is new to a menu layer since the last time the user viewed the content area, when a preset of a user-defined limit has been set, when a system warning condition has occurred, and/or when a program is set or about to be deleted. A user-defined limit may include a user setting the recorder 215 to record five episodes and after five episodes have been recorded either stop recording new episodes or delete the oldest episode replaced by a newly recorded episode. New content may include a newly recorded program, a downloaded program, newly available content, a newly available channel, and/or a newly available service.

Significant time, effort, and/or financial resources may be committed to creating pleasing, efficient icons that are in harmony with the entire user interface (e.g., a thematic user interface). Thus, any disturbance or alteration of the icons may adversely influence the effectiveness of the user interface as a whole and/or the program guide itself. However, the example methods and apparatus described herein enable a content provider (e.g., DIRECTV) to design icons maintaining harmony with the fundamental aspects (i.e., common themes) of the user interface. The examples described herein also enable a content provider (e.g., DIRECTV) to present a user with more information than previously available regarding programs, and the status of content thereon.

Figure 3:
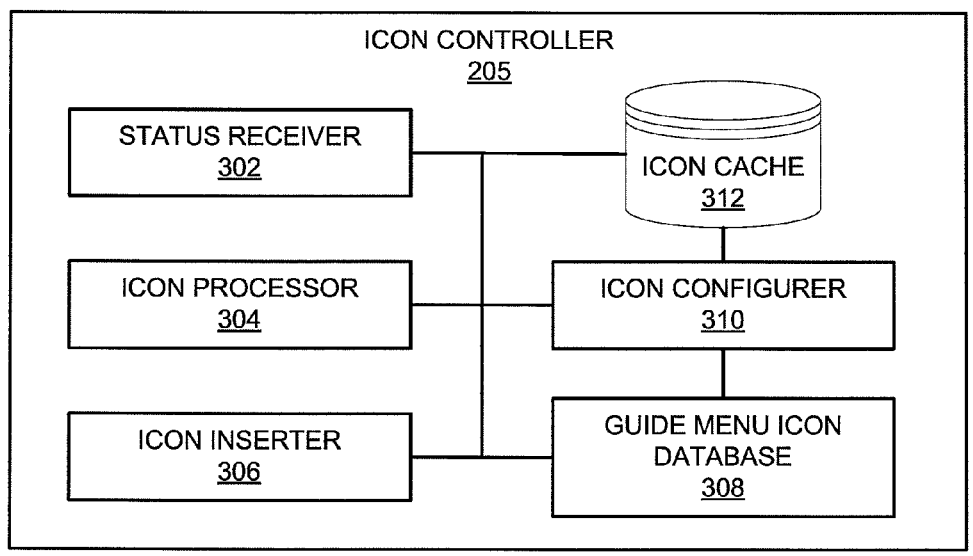
FIG. 3 shows an example manner of implementing the example icon controller of FIG. 2.

FIG. 3 shows an implementation of the example icon controller 205 of FIG. 2. The example icon controller 205 includes a status receiver 302, an icon processor 304, an icon inserter 306, a guide menu icon database 308, an icon configurer 310, and an icon cache 312. The status receiver 302, the icon processor 304, and the icon inserter 306 may be communicatively coupled to functional blocks (e.g., the recorder 215, the storage device 225, etc.) within the IRD 130. To conditionally display icons based on a status change of content, the status receiver 302 monitors for content status changes in the IRD 130. The status receiver 302 may poll functional blocks such as the recorder 215 for content updates and/or receive content status messages from the IRD 130 and/or functional blocks within the IRD 130.

For example, if the recorder 215 records a new program, the status receiver 302 may receive a content status message from the recorder 215 including the file name, when the program was recorded, the memory location of the program, the menu layer location where the program is listed in the guide menu, and the program identification information. In response to the content status message, the status receiver 302 forwards the content status message to the icon processor 304 to check with the icon cache 312 to determine if an icon is displayed in the menu layers associated with the newly recorded program. In a specific example, a user may configure the example icon controller 205 to display an icon for new episodes of the television series 'Top Chef,' while not configuring the icon controller 205 to display an icon for new episodes of the television series 'Lost.' Thus, when the status receiver 302 receives a content status message indicating a new episode of 'Top Chef' has been recorded, the icon controller 205 displays an icon in the corresponding menu layers, while an icon is not displayed when the status receiver 302 receives a content status message indicating a new episode of 'Lost' has been recorded. Additionally, the status receiver 302 may receive indications of content changes from the service provider via the control data source 110, the data service source 112, the program guide data source 114, the OD source 115, and/or any other functional entity that may provide new content, changed content, an indication of new content, and/or a change in the status of content. Content new and/or changed content from the service provider may include services, channels, IRD 130 software updates, etc. Furthermore, the status receiver 302 may receive new icons, modified icons, or instructions to remove icons from the service provider.

Additionally or alternatively, the example status receiver 302 may detect status changes within the IRD 130 by monitoring the IRD 130 and/or the functional blocks within the IRD 130 for new content and/or content changes. If a change in the status of content is detected, the status receiver 302 acquires the program file information and passes the information to the icon processor 304. For example, the status receiver 302 may detect a new program has been recorded by the recorder 215. As a result, the status receiver 302 determines the program file information, the record time, the menu layer location containing a listing of the recorded content, and/or the file information and passes the information to the icon processor 304.

In the example implementation of FIG. 3, the example icon processor 304 manages the control of the icon controller 205 including coordinating the creation of records containing icon display information, managing the display of icons, and managing the configuration of icons. In addition to any number and/or type(s) of specialized hardware, firmware and/or logic to perform processing functions, the example icon processor 304 includes any number and/or type(s) of specialized and/or general purpose controller(s) and/or processing unit(s) capable of executing coded instructions. For example, the controller and/or processing unit may perform any number and/or type(s) of processing functions by carrying out and/or executing coded instructions present in a memory (not shown) communicatively coupled and/or within the icon processor 304 (e.g., within a random-access memory (RAM), a read-only memory (ROM) and/or on-board memory of the icon processor 304).

The example icon processor 304 communicates with the memory (including a read-only memory (ROM) and/or the RAM) and/or other devices and/or modules of the example icon controller 205 of FIG. 3 via any type(s) and/or number of buses. The RAM may be implemented by, for example, dynamic random-access memory (DRAM), synchronous dynamic random-access memory (SDRAM), and/or any other type of RAM device(s). The ROM may be implemented by, for example, flash memory(-ies) and/or any other desired type of memory device(s). Additionally, the guide menu icon database 308 and icon cache 312 are memories that may be implemented by a ROM and/or a RAM.

To conditionally display icons within menu layers of a user interface, the example icon processor 304 determines if content status changes match the conditions to display one or more icons. The icon processor 304 receives indications of content status changes via content status messages from the status receiver 302. Upon receiving a content status message, the icon processor 304 determines if there is a corresponding icon for the status change. If there is a match, the icon processor 304 creates a record in the guide menu icon database 308 and notifies the icon inserter 306 to display the matching icon on the corresponding menu layers. The display notification sent to the icon inserter 306 may include a display message including the menu layer location of the changed content and the icon to be displayed. The display message may include a reference to the icon to be displayed, an identification code of the icon to be displayed, and/or the file location of the record containing the icon to be displayed. Additionally, the icon processor 304 determines if any of the conditions of displayed icons have changed and performs the appropriate action such as, for example, removing a displayed icon and/or replacing a displayed icon with a second icon. While all newly recorded programs are considered to have a status change, the icon processor 304 determines which of the newly recorded programs are indicated with an icon. As a default, the service provider may configure the icon processor 304 and/or the icon configurer 310 to indicate all newly recorded programs with an icon.

The example icon processor 304 determines if there is a corresponding icon for the status change by checking a list of conditions in the icon cache 312. The list of conditions includes criteria for matching icons to content status changes and/or criteria for displaying the icon. The list of conditions may include a hash table with individual rules and/or a collection of rules individually stored in the icon cache 312. Each rule includes the program type, program name, program classification, status change type, icon display time, user associated with the icon, etc. For example, a rule in the list of conditions may include a program type of 'Movie,' a program classification of 'Sports-Football,' a status change type of 'record,' and an icon display time of '36 hours.' Additionally, the rule corresponds to an icon including a graphic of a blue circle. If the icon processor 304 receives a content status message indicating a sports movie about football was recorded, the icon processor 304 would match the content status message to the rule, create a record including the program information, file information, menu layer location in the program guide for the listing of the recorded football movie, and the blue circle icon corresponding to the rule. The icon processor 304 sends the icon inserter 306 a display message including the menu layer location of the listing of the football movie and the blue circle icon to display. Additionally or alternatively, the icon processor may set a flag (e.g., a bit) in an existing program, a program list, and/or program data. For example, if a program is newly recorded and the icon processor 304 determines the new program is to be indicated with a square icon, the icon processor 304 saves a reference code of the square to a program file containing the program. The IRD 130 detects the icon reference code in the data associated with the program file and displays the square icon in the corresponding menu layers.

In another example, the status receiver 302 detects when a user selects and views content that has been marked with a red circle new record icon. The conditions of the red circle new record icon indicate the icon is to be removed from display upon a user viewing the content. The status receiver 302 sends the icon processor 304 a content status message indicating content has been viewed. Upon receiving the message, the icon processor 304 checks the list of conditions in the icon cache 312 to determine if the status change corresponds to one or more rules and the records in the guide menu icon database 308 to determine of the status change corresponds to a created record. The icon processor 304 finds a record in the guide menu icon database 308 corresponding to the viewed content and the red circle new record icon. Because the content status message indicates the content was viewed, the icon processor 304 determines the icon can be removed from display. The red circle new record icon is removed from display by the icon processor 304 sending the icon inserter 306 a display message indicating the menu layer location of the icon to remove and deletes the record in the guide menu icon database 308. Alternatively, the conditions of the red circle new record icon may indicate the icon is to be removed from display upon a user viewing a listing of the corresponding content. Furthermore, the service provider may determine the conditions for removing an icon including viewing a portion of the content, viewing the content in its entirety, viewing a listing of the content, and/or not viewing the content for a time period.

In the example implementation of FIG. 3 the icon processor 304 periodically checks the records in the guide menu icon database 308 to verify that the conditions to display the icons are still valid. For example, if the guide menu icon database 308 contains a rule where an icon of the number 5 is displayed when there are five records corresponding to five new episodes of 'Top Chef' that have been recorded and not viewed. The icon processor 304 may count the records and determine the conditions for the rule are met. As a result, the icon processor 304 accesses the corresponding icon from the icon cache 312, creates a record of the five recorded unviewed episodes, and sends a message to the icon inserter to display the icon in the corresponding menu layers in the guide menu.

In another example, an icon contains a condition where it is to be displayed in the guide menu for three days after a program is recorded. The icon processor 304 checks the records in the guide menu icon database 308 and determines a record includes an icon that has been displayed for three days indicating a recorded program. As a result, the icon processor 304 deletes the record and sends a message to the icon inserter 306 to remove the icon from the corresponding menu layers. The icon processor 304 additionally checks records in the guide menu icon database 308 to determine if a changing condition of an icon matches a different rule within the list of conditions corresponding to a different icon in the icon cache 312. In the example above, after the icon processor 304 determines to remove the display of the three day icon, the icon processor 304 checks the icon cache and determines a graphic icon of the number five is displayed for content recorded between three-five days in the past. As a result, the icon processor 304 creates a new record with the same program content information as the previous record with the three day icon, but with a reference to the five day icon and sends a display message to the icon inserter 306 to display the five day icon. Thus, the icon processor 304 replaces the three day icon with the five day icon in the menu layers containing a listing for the recorded content. Alternatively, the changing condition from three days may correspond to a rule to change the fading level of the three day icon such that as time elapses past three days the appearance or brightness of the three day icon fades or decays. If the three day icon was green at three days, over time the icon processor 304 may change the fading such that the three day icon is yellow after three days, red after five days, brown after seven days, and black after ten days.

In another example, the list of conditions may include a rule designating a yellow star to be displayed for each new (e.g., first run) episode of the television series 'Top Chef.' When the status receiver 302 receives an indication a new episode of 'Top Chef' has been recorded, the icon processor 304 checks the list of conditions and determines the new episode matches the new episode of 'Top Chef' rule. As a result, the icon processor 304 creates a record in the guide menu icon database 308 and adds the file information from the recorded 'Top Chef' episode and the yellow star icon type to the record in the guide menu icon database 308. The icon processor 304 then sends the icon inserter 306 a display message including the yellow star icon to display and the menu layer location of the listing of the new episode of 'Top Chef.' Additionally, the list of conditions may include rules for displaying default icons in cases when the number of icons to be displayed on a higher menu layer exceeds a predetermined threshold value (e.g., more than three icons displayed per tab). The default icons indicate multiple icons corresponding to content in lower menu layers. For example, an icon of a yellow sun may indicate there are three or more new programs in menu layers within the currently viewed menu layer.

The list of conditions within the example icon cache 312 may be predetermined by the service provider. Additionally, the icon configurer 310 enables a user to modify, create, and/or remove rules within the list of conditions and the icons in the icon cache 312. Alternatively, the icon configurer 310 may be configured by a service provider to enable users to change only a subset of the rules and/or none of the rules within the list of conditions. The icon configurer 310 enables a user to change icon properties such as visual properties including shape, color, size, icon type, icon image, animation, and text and/or audio properties including tone and volume. Additionally, icon conditions may be modified including display conditions such as, for example, program type, content type, status type, display time, and/or user. For example, a star icon may contain a color property including green, yellow, red, and blue selections, a size property including small, medium, and large selections, or 25 pixels by 25 pixels, 50 pixels by 50 pixels, and 100 pixels by pixels selections, a shadow property including YES and NO selections, an animation property including spin, blink, pulse, fade, rotate, and dance selections, and a text property including letters, numbers, and symbols. For example, text entered in the text property may be displayed within, adjacent to, and/or displayed over a graphical icon. Additionally, the star icon may include audio properties such as tone with high pitch, low bass, etc., selections and volume with a 0-10 numeric selection. Furthermore, the conditions to display an icon may include a browse feature to search the program guide for a program, content, or show or a text box to manually type the content, program, or show name and/or description. The conditions also include status type and display location. Status types include new shows, downloaded shows, new content, programs marked for deletion, episode limits, memory capacity limits, new IRD 130 software, new channels, etc. Display locations may include icon placement on the menu layer tab, icon placement on the menu layer, the number of menu layers in a hierarchy to display an icon, placement on the guide menu, placement on the video display, and/or placement in any other user interface or menu accessible by a user. Additionally, icons may be displayed outside and/or adjacent to menu layers such as, for example, displaying icons over live television video, in a channel banner, in an options menu, in a setup menu, and/or in a main menu. Furthermore, the conditions to display an icon include an icon display time parameter and a user parameter to match an icon to a program or content status change where the status change is tied to a user.

The icon configurer 310 controls a user interface that a user may use to change icon properties and conditions. If a user changes the properties and/or conditions of an icon, the icon configurer 310 modifies the list of conditions and/or the icon in the icon cache 312 and sends a message to the icon processor 304 to update the records in the guide menu icon database 308 corresponding to the modified icon. The icon properties and conditions may be presented to the user by the icon configurer 310 in a drop-down menu preconfigured by the service provider. Additionally or alternatively, the icon properties and conditions the may be programmed, created, and/or modified by a user.

The example icon inserter 306 shown in FIG. 3 conditionally displays icons in a guide menu by receiving an indication to display an icon, accessing menu layers in the guide menu associated with the icon, and displaying the icon in the menu layers. The icon inserter 306 receives the indication to display an icon from a display message sent from the icon processor 304. The indication may also include an action to remove an icon from display and/or change the location and/or the menu layers where an icon is displayed. For example, when the icon inserter 306 receives a display message, it uses the menu layer information in the display message to access the menu layer containing the content within the hierarchy of menu layers in the guide menu and adds the icon for display in proximity to the corresponding content. The icon inserter 306 then accesses the next higher menu layer and adds the icon to the menu layer tab, or the location specified in the conditions of the icon and then progresses to the next higher menu layer and adds the icon to the menu layer tab. The icon inserter 306 continues these actions until the icon is displayed on the highest menu layer in the menu section containing the updated and/or changed content. Additionally, based on the location information within the indication, the icon inserter 306 may insert an icon into a menu section, a guide menu, a user interface menu, a widget, and/or a channel banner.

Displaying an icon may include the example icon inserter 306 creating a function in the file of the menu layers to display the icon in the appropriate menu layers when the menu section is accessed by a user. Additionally, displaying an icon may include adding a link to the menu layer containing the updated content so that if a user selects the icon displayed on a top menu layer, the corresponding lower and/or lateral menu layer containing the associated content is displayed. Furthermore, an icon may be displayed next to a tab, a button, a menu item, or any other selectable menu item associated with the menu layer including a link to the menu layer containing the updated content. The icon inserter 306 may display more than one icon per the same content. For example, the icon inserter 306 may display a star to represent a newly downloaded program, and text of U1 to indicate the program was configured to be recorded by a first user, and an icon of the text 'D' to indicate the content will be deleted within 24 hours.

While an example manner of implementing the icon controller 205 of FIG. 2 has been illustrated in FIG. 3, one or more of the elements, processes and/or devices illustrated in FIG. 3 may be combined, divided, re-arranged, omitted, eliminated and/or implemented in any other way. Further, the example status receiver 302, the example icon processor 304, the example icon inserter 306, the example guide menu icon database 308, the example icon configurer 310, the example icon cache 312, and/or, more generally, the example icon controller 205 of FIG. 3 may be implemented by hardware, software, firmware and/or any combination of hardware, software and/or firmware. Thus, for example, any of the example status receiver 302, the example icon processor 304, the example icon inserter 306, the example guide menu icon database 308, the example icon configurer 310, the example icon cache 312, and/or, more generally, the example icon controller 205 of FIG. 3 could be implemented by one or more circuit(s), programmable processor(s), application specific integrated circuit(s) (ASIC(s)), programmable logic device (s) (PLD(s)) and/or field programmable logic device(s) (FPLD(s)), etc. When any of the appended claims are read to cover a purely software implementation, at least one of the example status receiver 302, the example icon processor 304, the example icon inserter 306, the example guide menu icon database 308, the example icon configurer 310, the example icon cache 312, and/or, more generally, the example icon controller 205 of FIG. 3 are hereby expressly defined to include a tangible medium such as a memory, DVD, CD, etc. Further still, the example icon controller 205 of FIG. 3 may include one or more elements, processes and/or devices in addition to, or instead of, those illustrated in FIG. 3, and/or may include more than one of any or all of the illustrated elements, processes and devices.

Figure 4:
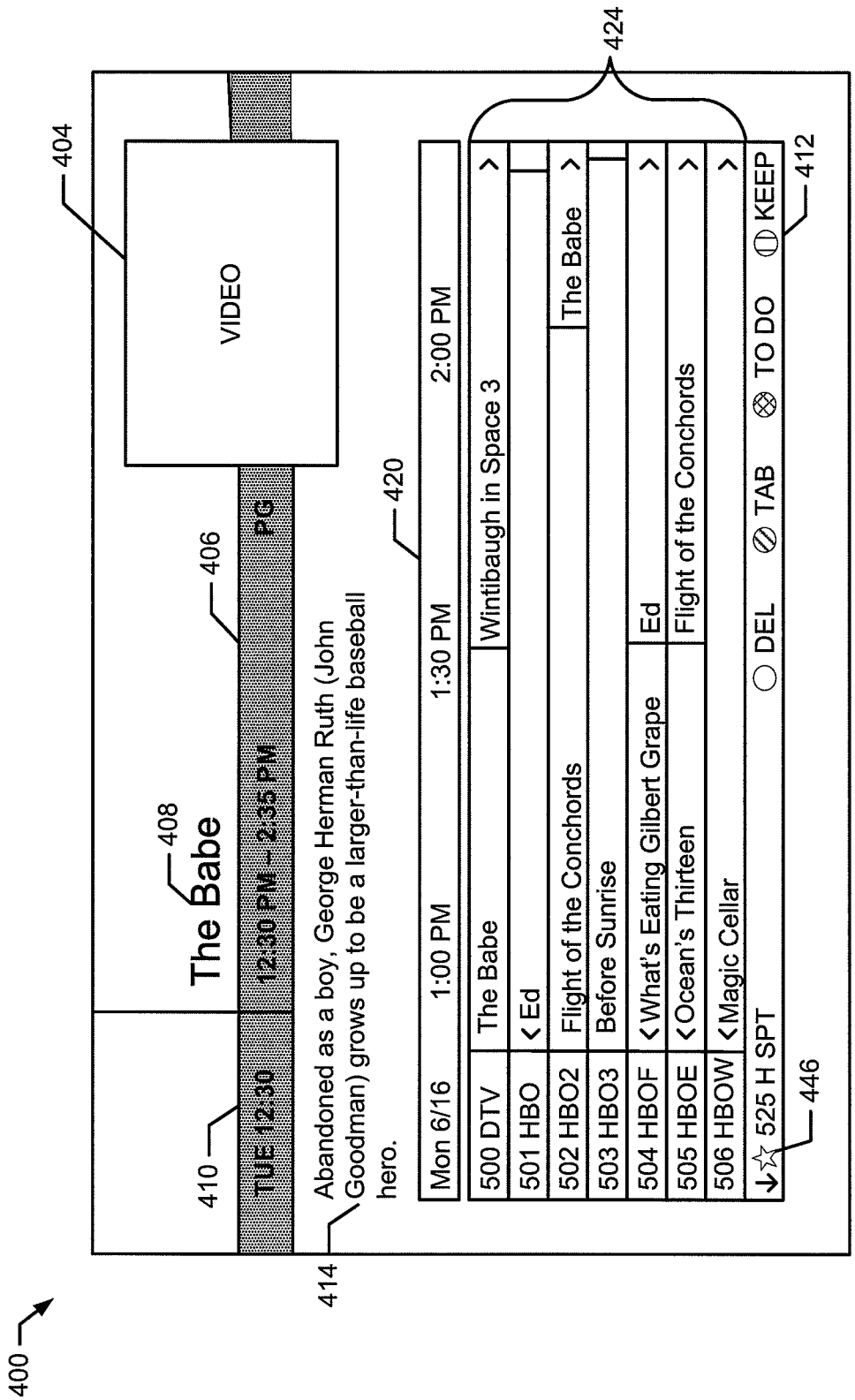
FIG. 4 shows an example program guide including an example icon displayed in example menu guide.

FIG. 4 shows an example program guide 400 including an example icon 446. In this example, the program guide 400 includes a video section 404, a program schedule bar 406, a title section 408, a current date and time section 410, a button bar 412, an information section 414, a time indicator 420, and a list of programs 424. However, the program guide 400 (as well as the program guides 500, 600, and 700 FIGS. 5A, 5B, 6, 7A, and 7B) is only one example that may vary in arrangement, shape, number of sections, type of information, etc. Such a program guide 400 may be designed and/or implemented, for example, by the administrators of the content delivery system (e.g., DIRECTV programmers).

The list of programs 424 enables a user to determine which programs can be seen on which channels for given times. In the illustrated example of FIG. 4, the list of program 424 includes a list of channel cells, such that individual program cells (e.g., Before Sunrise) are aligned with the associated individual channel cells (e.g., channel 503 HBO3). The time indicator 420 informs the user of a day and time to which the currently displayed program cells correspond and may be set, for example, in 30 minutes increments or any other suitable duration. A user may shift the displayed time period (and thus the corresponding entries of the list of programs 424) via an input device using a set of keys that move a cursor within the program guide.

The button bar 412 located below the menu section 402 includes graphics and/or text to indicate an operation corresponding to a button on an input device (e.g., an IR remote control). For example, the dots shown on the button bar 412 may be different colors to correspond to a same color button on an input device. By way of illustration, the operations shown on the button bar 412 of FIG. 4 are 'DEL,' 'TAB,' 'TO DO,' and 'KEEP.' The corresponding buttons on the input device support a one-touch functionality that allows the same button to be used for multiple one-touch functions on different screens of the user interface. Here, the first button (i.e., the 'DEL' button) may be red and may correspond to an operation that deletes a selected program and/or content. Conversely, the second button (i.e., the 'TAB' button) may correspond to an operation that cycles through menu layers by bringing the next menu layer in a predetermined order to the top of the display enabling a user to view the contents of the displayed menu layer.

The video section 404 may include a display of the channel to which the system is currently tuned, or the recorded content currently being played back. The video section 404 allows a user to continue viewing broadcast or recorded content while navigating through the program guide 400. For example, if a user is viewing a live baseball game and navigates (e.g., by engaging a button on an input device) to the program guide 400, the video section 404 displays the baseball game. In another example, if a recording of a movie is currently being played and a user navigates to the program guide 400, the video section 404 displays the recorded movie, allowing the user to simultaneously examine the program guide 400 and watch the recorded content. The video section 404 may also present alternative content (e.g., an advertisement or promotion) as determined by, for example, the administrators of the content delivery system (e.g., DIRECTV® programmers) or the user.

The information section 414, the program schedule bar 406, and the title section 408 display information associated with a currently highlighted list entry such as, for example the first program 'The Babe.' The user may highlight such an entry via navigation buttons on an input device. The information section 414 may include a description of a television show, a list of lead actors, purchase information, duration information, a plot summary, etc. The program schedule bar 406 may indicate the date, time, duration, and rating of the currently highlighted list entry. The title section 408 may include the title of a program, a channel, mode of operation, etc.

As mentioned above, the example methods and apparatus described herein enable a content provider to conditionally display icons in a guide menu and/or user interface to indicate the status of content. In the illustrated example of FIG. 4, the icon 446 graphically depicts a star indicating new content. The icon 446 is displayed in the program guide 400 on the button bar 412 next to an arrow. The star icon 446 indicates there is a new channel in the program guide 400. The arrow adjacent to the star icon 446 indicates a user must scroll down in the program guide 400 to view the new channel. Additionally, the text '525 H SPT' indicates the numerical location of the new channel within the list of programs 424 and the abbreviated name of the new channel. The star icon 446 provides an attention getting visual image to direct a user to scroll down in the list of programs 424 to the new channel. Additionally or alternatively, a user may click (e.g., select) on the icons 446 and directly move the list of programs 424 to the new channel and/or display the video associated with the new channel in the video section 404.

Figure 5A:
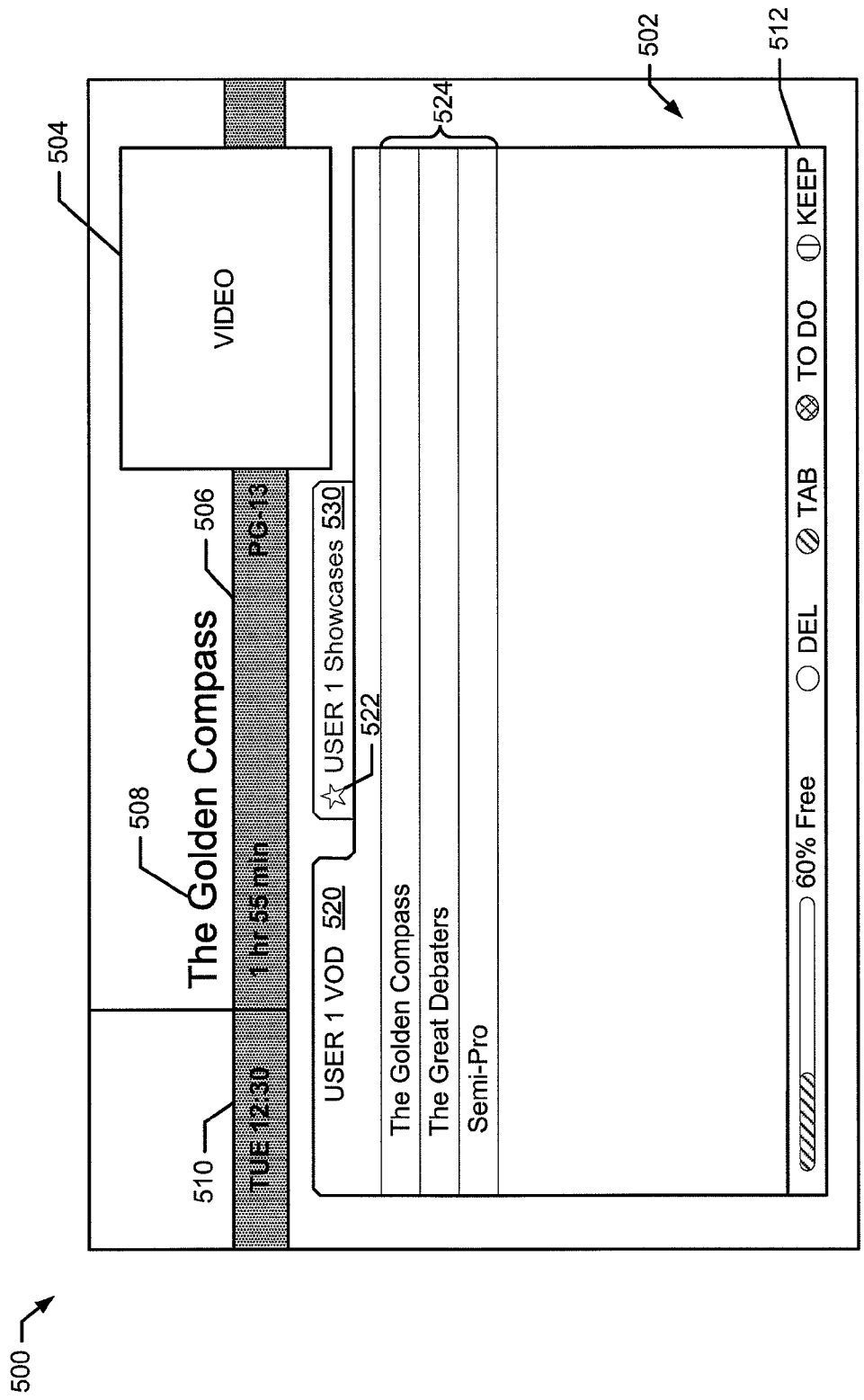
FIG. 5A shows an example program guide including an example icon displayed on a tab of an example menu layer.

FIG. 5A shows an example program guide 500 including an example icon 522. Similar to the program guide 400 of FIG. 4, the program guide 500 of FIG. 5A includes a menu section 502, a video section 504, a program schedule bar 506, a title section 508, a current date and time section 510, a button bar 512, menu layers 520 and 530, and programs 524, all of which perform similar functions as the related elements of FIG. 4. Additionally, the button bar 512 includes a memory indicator displaying the percentage of free memory. The memory bar may correspond to the total available memory for the IRD 130 and/or the memory allocated for the displayed menu layer.

The menu section 502 includes menu layers 520 and 530 for USER 1. The menu layer 520 includes recorded VOD content comprising the listed programs 524 that were scheduled to be recorded by USER 1. The menu layer 530 includes a listing of Showcases scheduled to be recorded by USER 1. The menu layer 520 does not include sub-menu layers. FIG. 5A shows the icon 522 indicating new content in menu layer 530 despite the menu layer 520 covering the view of the new content in menu layer 530. A user may view a listing of the content by selecting the tab for the menu layer 530 and/or by selecting the icon 522.

Figure 5B:
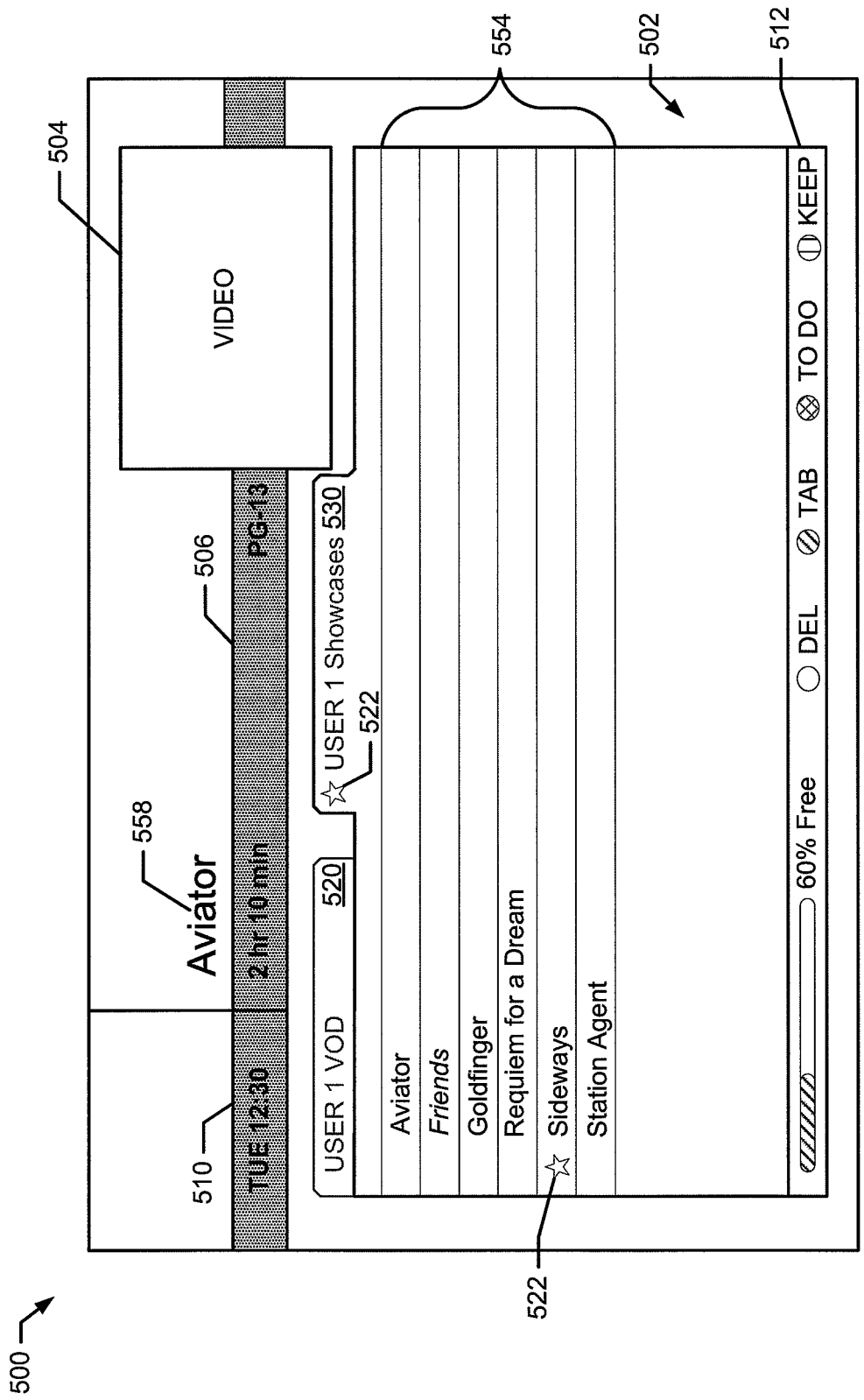
FIG. 5B shows the example program guide of FIG. 5A including the example icon displayed within the example menu layer.

FIG. 5B shows the example program guide 500 of FIG. 5A including the example icon 522. Similar to the program guide 400 of FIG. 4, the program guide 500 of FIG. 5B includes a menu section 502, a video section 504, a program schedule bar 506, a title section 508, a current date and time section 510, a button bar 512, menu layers 520 and 530, and programs 554, all of which perform similar functions as the related elements of FIG. 4. The menu section 502 includes menu layers 520 and 530 for USER 1. FIG. 5B shows the contents of the menu layer 530 upon a user selecting the menu layer 530. The menu layer 530 includes recorded Showcases content comprising the listed programs 554 that were scheduled to be recorded by USER 1. The menu layer 530 does not include sub-menu layers. FIG. 5B shows the icon 522 indicating new content in menu layer 530. The new content displayed in the tab of the menu layer 530 is also displayed next to the listing of the new content (i.e., 'Sideways') within the menu layer 530.

Figure 6:
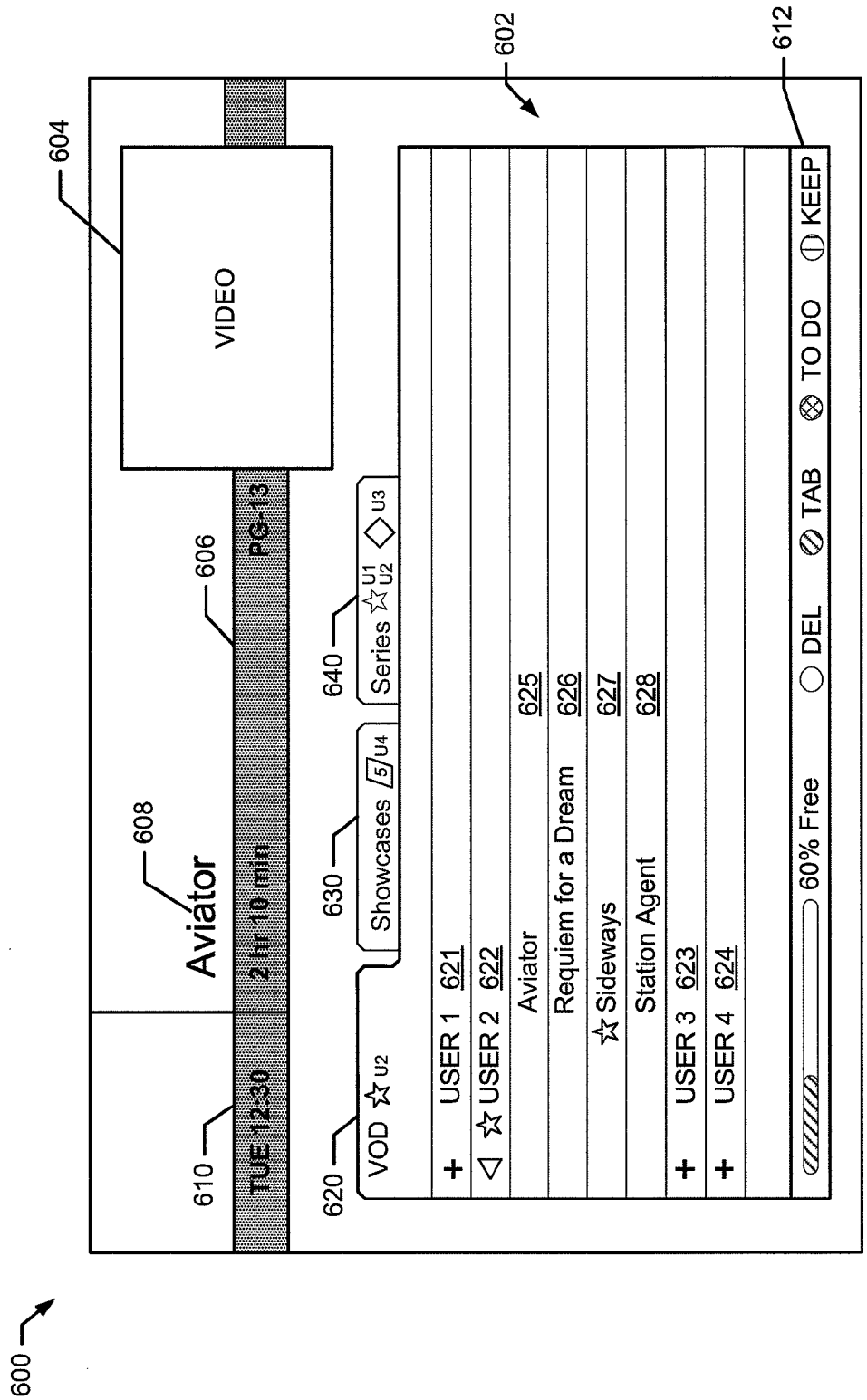
FIG. 6 shows an example program guide including example icons, example menu layers, and example sub-menu layers.

FIG. 6 shows an example program guide 600 including example icons and sub-menu layers. Similar to the program guide 400 of FIG. 4, the program guide 600 of FIG. 6 includes a menu section 602, a video section 604, a program schedule bar 606, a title section 608, a current date and time section 610, and a button bar 612 all of which perform similar functions as the related elements of FIG. 4. Additionally, the example program guide includes first menu layers 620-640, second menu layers 621-624, and programs 625-628. The first menu layers 620-640 within the menu section 602 organize content according to the content type. For example, first menu layer 620 includes VOD content, the first menu layer 630 includes showcase content, and the first menu layer 640 includes television series content.

The tabs of the first menu layers 620-640 include icons indicating the status of content within the respective menu layer. For example, the first menu layer 630 displays a rhombus icon with the text value of '5' and an adjacent text value icon of 'U4.' This indicates a storage memory limit of five showcases has been reached for USER 4. In another example, the first menu layer 640 includes a graphical representation of a star icon with 'U1' and 'U2' adjacent text icons. This indicates there is a newly recorded episode of a television series for USER 1 and a newly recorded episode of a television series for USER 2. Furthermore, the tab on first menu layer 640 includes a diamond icon with adjacent text icon 'U3.' In the example of FIG. 6, this indicates the maximum number of programs allotted to be recorded in a series has been reached for a television series being recorded by USER 3.

In the example of FIG. 6, first menu layer 620 is displayed and includes second menu layers 621-624 with the content of the second menu layer 622 displayed. The star icon in the tab of the first menu layer 620 is displayed next to the text (i.e., 'USER 2') in the second menu layer 622, and displayed next to the title (i.e., 'Sideways') of the content in program 627. When the program 627 was recorded by the recorder 215 of FIG. 2, the status receiver 302 of FIG. 3 detected the newly recorded program. As a result, the status receiver 302 sent a content status message to the icon processor 304 which compared the recorded program to a list of conditions in the icon cache 312. In the example of FIG. 6 there is a rule with a condition to display a star icon upon recording a new VOD program. Thus, the icon processor 304 created a record in the guide menu icon database 308 of the newly recorded VOD program and the listing location of the VOD program 627 in the second menu layer 622. The icon processor 304 sent the icon inserter 306 a display message including the star icon and menu layer location. Upon receiving the display message, the icon inserter 306 accessed the menu section 602 in the program guide and located the VOD program 627. The icon inserter 306 then displayed the star icon adjacent to the program 627 and adjacent to the menu layer 622. The icon inserter 306 then progressed to the higher menu layer (i.e., the menu layer 620) and displayed the star icon in the tab of the menu layer 620. The icon inserter 306 determined the menu layer 620 was the highest menu layer and could not display the star icon in any additional menu layers. By displaying the icon on hierarchical menu layers the systems and methods described herein enables a user to progressively open menu layers until the content with the status change is displayed. Additionally, a user may select the star icon in the tab of menu layer 620. Selecting the star icon, clicking on the star icon, and/or clicking on the tab with the star icon opens the second menu layer 622 and displays the programs 625-628 including the new program 627.

Figure 7A:
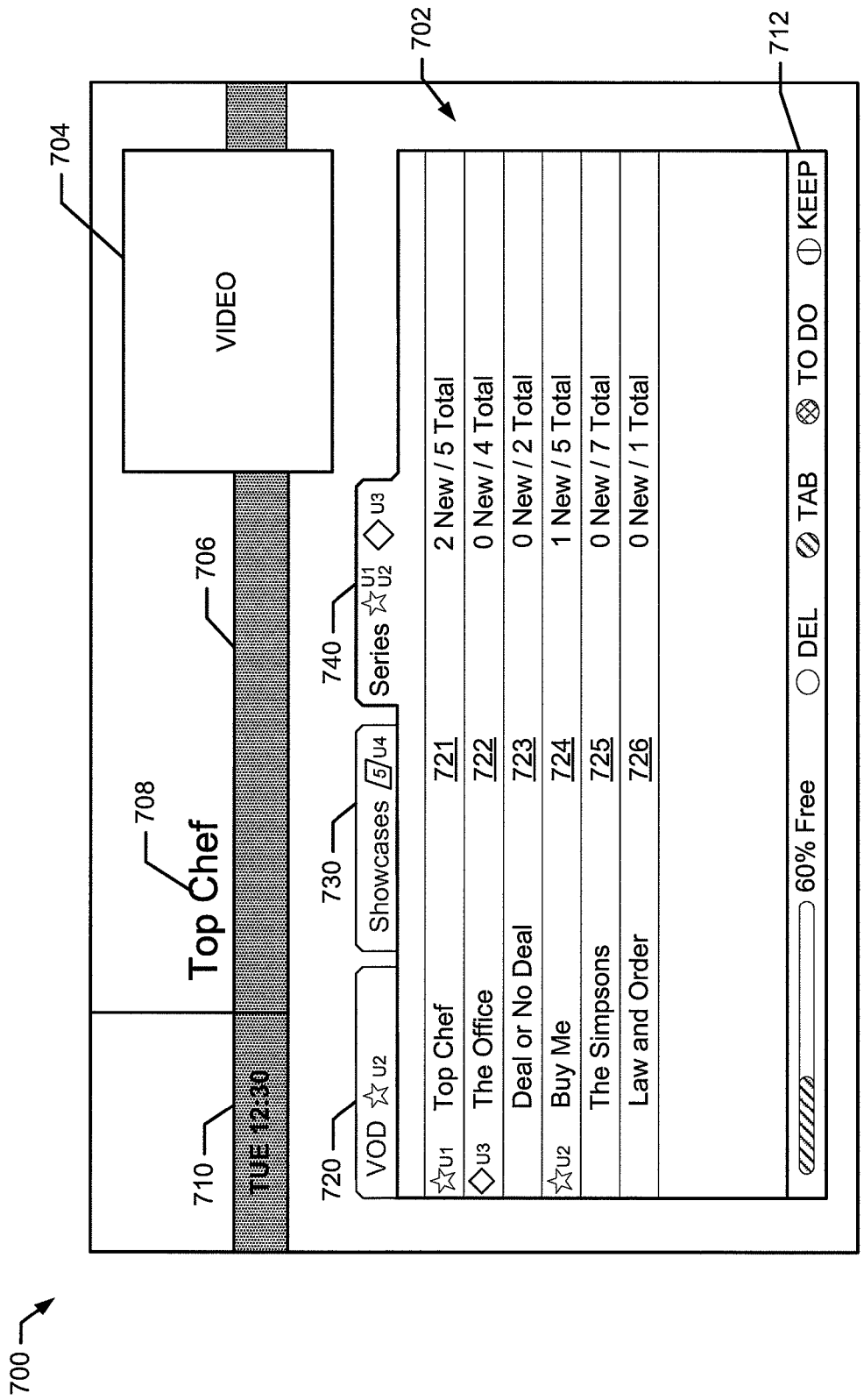
FIG. 7A shows the example program guide of FIG. 6 displaying example icons in an example menu layer.

FIG. 7A shows an example program guide 700 including example icons and sub-menu layers. Similar to the program guide 400 of FIG. 4, the program guide 700 of FIG. 7 includes a menu section 702, a video section 704, a program schedule bar 706, a title section 708, a current date and time section 710, and a button bar 712 all of which perform similar functions as the related elements of FIG. 4. Additionally, the example program guide 700 includes first menu layers 720-740 similar to the first menu layers 620-640 of FIG. 6. The series menu layer 740 includes second menu layers 721-726. The second menu layers 721-726 display a listing of different recorded television series. Each second menu layer contains television series episodes, however only a listing of the second menu layers is displayed. A user may display the contents of the second menu layers 721-726 by selecting the desired second menu layer. For example, a user may view the recorded episodes of the television series 'Top Chef' by selecting second menu layer 721.

The icons displayed in the tab of the first menu layer 740 correspond to the icons displayed on the listing of the second menu layers 721, 722, and 724. In the example of FIG. 7A, the star icon indicates a newly recorded show is available for viewing and the diamond icon indicates a show capacity limit for a series has been reached. For example, the star with the adjacent 'U1' and 'U2' corresponds to a new episode of 'Top Chef' in menu layer 721 for USER 1 (i.e., U1) and a new episode of 'Buy Me' in menu layer 724 for USER 2 (i.e., U2). Additionally, the icon graphically represented by the diamond shape and the adjacent icon 'U3' corresponds to the diamond displayed in second menu layer 722. The diamond indicates the second menu layer 722 contains the maximum number of shows configured to be recorded for 'The Office.' The second menu layers 721-726 include a summary tally of the total number of episodes included in each second menu layer and the number of new unviewed episodes in each menu layer. For example, in the second menu layer 721 five episodes of the television series 'Top Chef' are recorded. In addition, two of those five recorded episodes are new and have not yet been viewed.

Figure 7B:
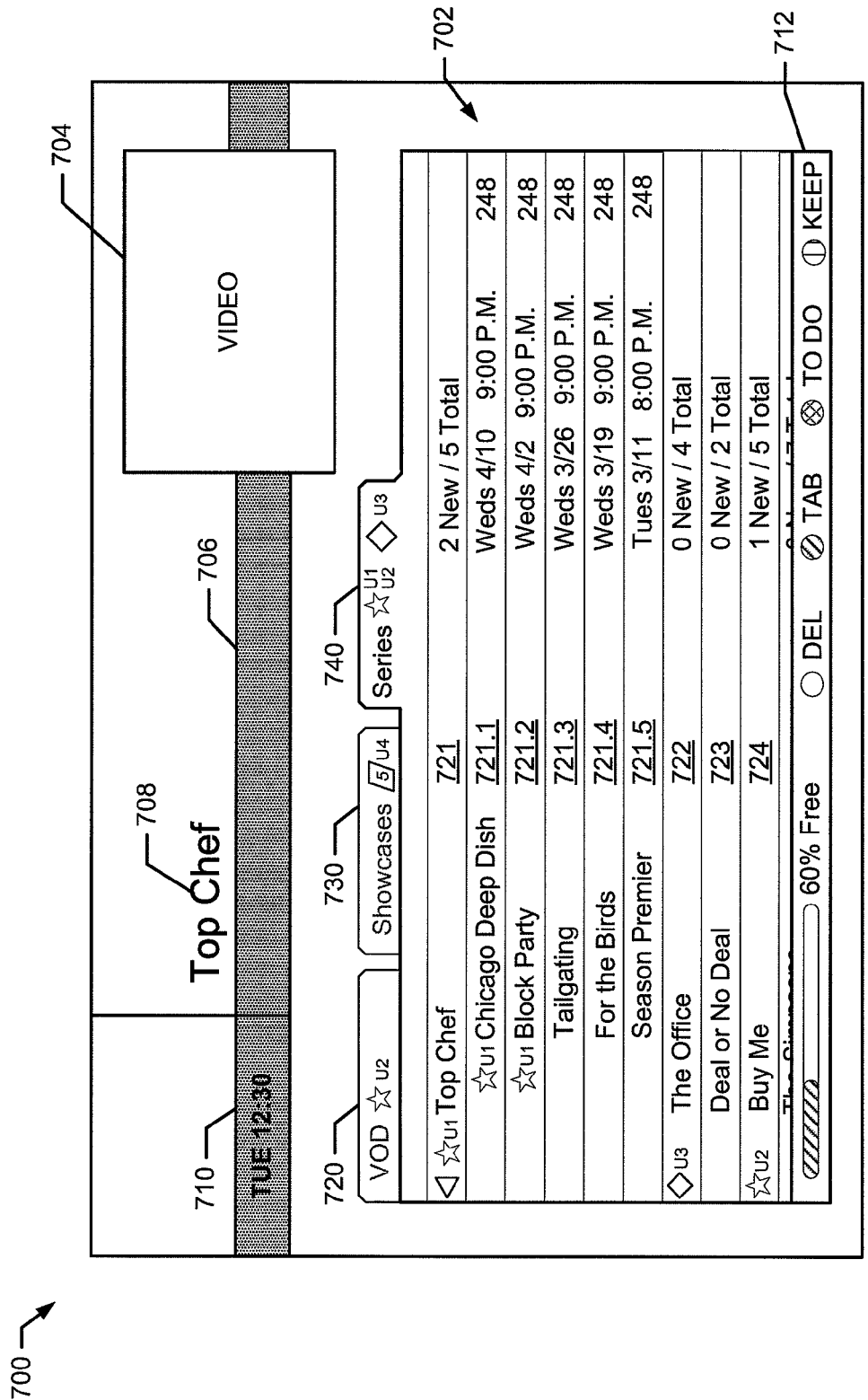
FIG. 7B shows the example program guide of FIG. 6 displaying the example icons in the example menu layer of FIG. 7A including an example sub-menu layer.

FIG. 7B shows the example program guide 700 of FIG. 7A including the menu section 702, the video section 704, the program schedule bar 706, the title section 708, the current date and time section 710, and the button bar 712 all of which perform similar functions as the related elements of FIG. 4. Additionally, the example program guide 700 includes the first menu layers 720-740 and the second menu layers 721-726 described in FIG. 7A. In the example of FIG. 7B, the second menu layer 721 is selected by a user to display a third menu layer including episodes 721.1-721.5. The episodes 721.1-721.5 are listings of recorded content that when selected cause the IRD 130 to display and play the content. For example, if a user selects episode 721.2 the IRD 130 will play the 'Block Party' episode of 'Top Chef.' The episodes include text that specifies the date, time, and channel the content was recorded. For example, the episode 721.5 was recorded Tuesday, March 11 at 8:00 P.M. on channel 248.

In the example of FIG. 7B, the episodes 721.1 and 721.2 include a star icon with a text icon 'U1' corresponding to the star and 'U1' icons displayed in the second menu layer 721 and the star and 'U1' icons displayed in the first menu layer 740. The star and 'U1' icons indicate episodes 721.1 and 721.2 are newly recorded unviewed episodes recorded by USER 1. If a user views the episode 721.1, the icon controller 205 of FIG. 3 removes the star and 'U1' icons from display in the third menu layer. Additionally, if the user views episodes 721.1 and 721.2, the icon controller 205 removes the star and 'U1' icons from display in the third menu layer, the 'U1' icon in the second menu layer 721 and first menu layer 740.

Figure 8:
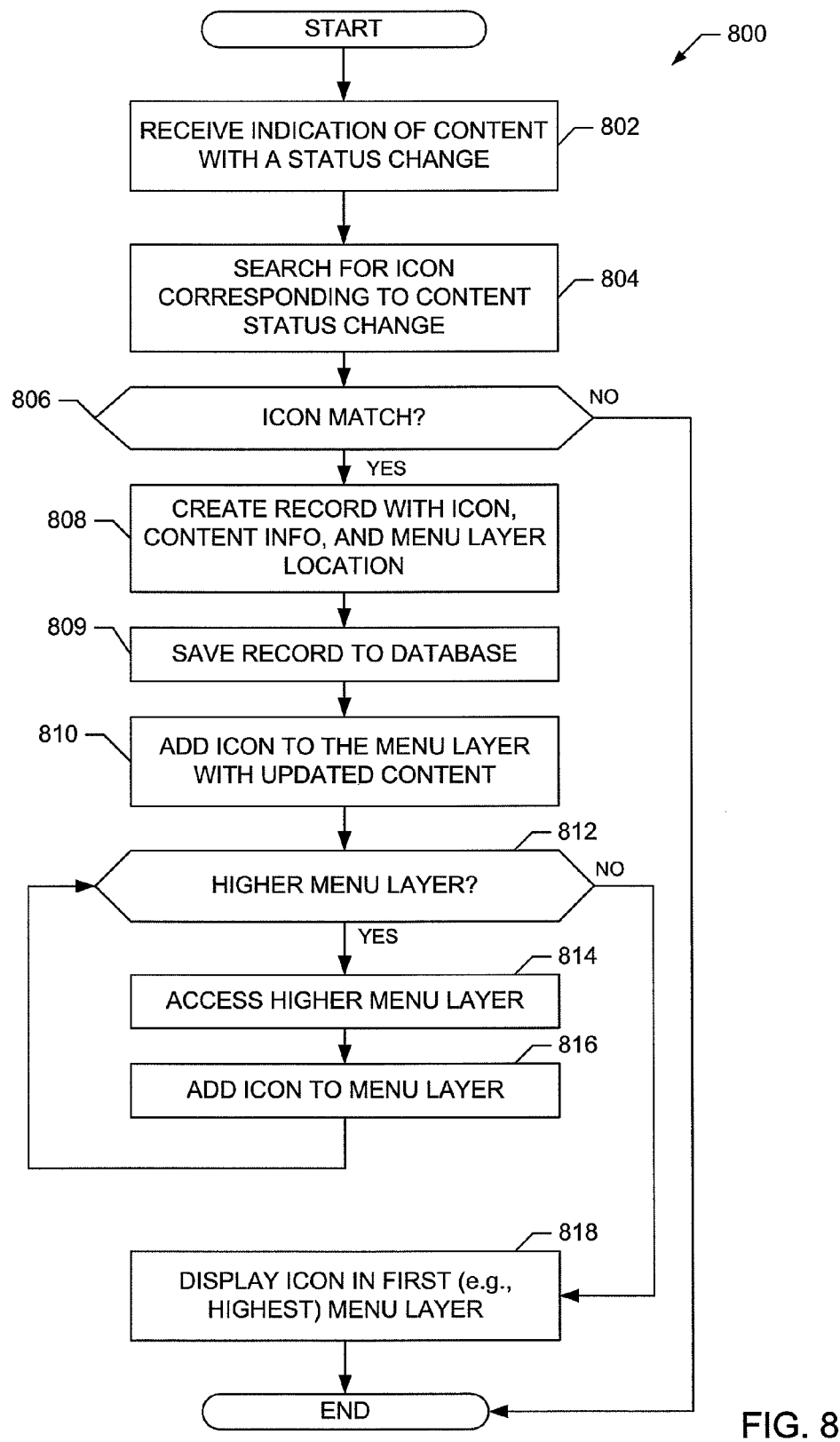
FIG. 8 is a flowchart representing an example process that may be performed by a media presentation system implementing the example icon controller of FIGS. 2 and 3.

FIG. 8 is a flowchart representing an example process 800 that may be implemented via, for example, the example icon controller 205 of FIG. 3. Specifically, the example process 800 conditionally displays icons in a user interface and/or a guide menu based on content status changes. The example process 800 may be executed using, for example, a processor system such as the system 900 of FIG. 9. However, one or more of the blocks depicted in the flowchart may be implemented in any other manner, including by dedicated purpose circuitry, manual operations, etc. Additionally, although the example instructions are described with reference to the flowchart of FIG. 8 other methods to conditionally display icons in a user interface and/or a guide menu based on content status changes may additionally or alternatively be used. For example, the order of execution of the blocks depicted in the flowcharts of FIG. 8 may be changed, and/or some of the blocks described may be rearranged, eliminated, or combined.

The example process 800 represented by FIG. 8 may be performed to implement the icon controller 205 of FIGS. 2 and 3. The example process 800 may be executed at predetermined intervals, based on an occurrence of a predetermined event, in response to a user request, etc., or on any combination thereof. For example, the process 800 may be executed at predetermined intervals, such as hourly, daily, etc. Additionally or alternatively, the example process 800 may be executed upon the occurrence of a trigger generated remotely such as, for example, the icon controller 205 receiving an indication of a content status change.

The example process 800 of FIG. 8 begins when the icon controller 205 receives an indication of a content status change (block 802). A Content status change includes an indication of a new show, a downloaded show, a new content, a program marked for deletion, an episode limit, a memory capacity limit, new IRD 130 software, new channels, etc. Additionally, a content status change includes a user viewing the changed content wherein the indication to display an icon indicating the change content can be removed. Upon receiving an indication of a content status change, the icon controller 205 searches a list of conditions to determine of the content status change can be matched to an icon (block 804). If there is not a match to at least one icon, the example process 800 ends. If the icon controller 205 finds a match to at least one icon, a record is created including the matching icon type, the content information, and the menu layer location (block 808). The content information includes the programming description, the file name, the file location, and/or the time of the content status change. Once the record is created, it is stored to a database such as, for example, the guide menu icon database 308 of FIG. 3 (block 809). Next, the matching icon is added to the menu layer containing a listing of the content with the content status change (block 810). The location on the menu layer for the matching icon to be displayed is specified within the configuration information of the icon. For example, the matching icon may be configured to be displayed in the tab of menu layers.

The icon controller 205 then determines if there is a higher menu layer in the hierarchical menu layer structure (block 812). If there is not a higher menu layer, control proceeds to block 818 where the matching icon is displayed in the highest menu layer when the menu layer is accessed by a user. If the menu layer is not the highest menu layer, the icon controller 205 accesses the next higher menu layer (block 814). The matching icon is then added to be displayed in the menu layer (block 816) and control returns to block 812. Once again the icon controller 205 determines if there is a higher menu layer (block 812). The example process 800 continues to execute the control loop of blocks 812, 814, and 816 until the matching icon is added to the highest menu layer. Once the matching icon is added to the highest menu layer, the matching icon is displayed in the highest menu layer when a user accesses the menu section containing the highest menu layer (block 818) and the example process 800 ends.

Figure 9:
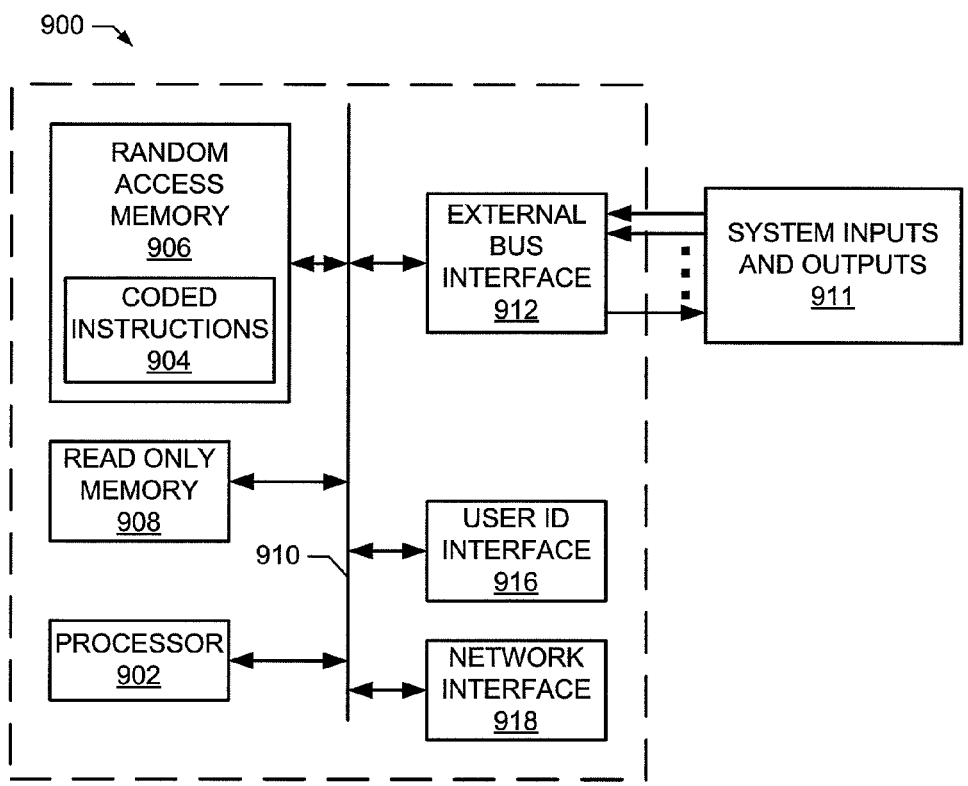
FIG. 9 illustrates an example manner of implementing an example processor unit to execute the example methods and apparatus described herein.

FIG. 9 is a schematic diagram of an example manner of implementing an example processor unit 900 to execute the example methods and apparatus described herein. The example processor unit 900 of FIG. 9 includes a general purpose programmable processor 902. The example processor 902 may execute, among other things, machine accessible instructions 904 (e.g., instructions present within a random access memory (RAM) 906 as illustrated and/or within a read only memory (ROM) 908) to perform the example processes described herein. The example processor 902 may be any type of processing unit, such as a microprocessor from the Intel® Pentium® family of microprocessors, the Intel® Itanium® family of microprocessors, and/or the Intel XScale® family of processors. The processor 902 may include on-board analog-to-digital (A/D) and digital-to-analog (D/A) converters.

The processor 902 may be coupled to an interface, such as a bus 910 to which other components may be interfaced. The example RAM 906 may be implemented by dynamic random access memory (DRAM), Synchronous DRAM (SDRAM), and/or any other type of RAM device, and the example ROM 908 may be implemented by flash memory and/or any other desired type of memory device. Access to the example memories 908 and 906 may be controlled by a memory controller (not shown) in a conventional manner.

To send and/or receive system inputs and/or outputs, the example processor unit 900 includes any variety of conventional interface circuitry such as, for example, an external bus interface 912. For example, the external bus interface 912 may provide one input signal path (e.g., a semiconductor package pin) for each system input. Additionally or alternatively, the external bus interface 912 may implement any variety of time multiplexed interface to receive output signals via fewer input signals.

To allow the example processor unit 900 to interact with a remote server, the example processor unit 900 may include any variety of network interfaces 918 such as, for example, an Ethernet card, a wireless network card, a modem, or any other network interface suitable to connect the processor unit 900 to a network. The network to which the processor unit 900 is connected may be, for example, a local area network (LAN), a wide area network (WAN), the Internet, or any other network. For example, the network could be a home network, an intranet located in a place of business, a closed network linking various locations of a business, or the Internet.

Although an example processor unit 900 has been illustrated in FIG. 9, processor units may be implemented using any of a variety of other and/or additional devices, components, circuits, modules, etc. Further, the devices, components, circuits, modules, elements, etc. illustrated in FIG. 9 may be combined, re-arranged, eliminated and/or implemented in any of a variety of ways.

The apparatus and methods described above are non-limiting examples. Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. A method comprising:
   displaying a first menu layer having a first tab within a guide menu, the first menu layer including a first plurality of items including one or more of a first plurality of selectable sub-menu layers or a first listing of a plurality of media programs;
   displaying a first icon within the first tab of the first menu layer to indicate a first status of at least a first item of the first plurality of items in the first menu layer; and
   simultaneously displaying the first icon adjacent the first item associated with the first status.

2. The method of claim 1 further comprising displaying the first icon adjacent a second item of the first plurality of items in the first menu layer to indicate a second status of the second item.

3. The method of claim 2 further comprising displaying a second icon associated with a first user in the first tab of the first menu layer to indicate that the first status of the first item is associated with the first user.

4. The method of claim 3 further comprising displaying the second icon adjacent the first item.

5. The method of claim 4 further comprising displaying a third icon associated with a second user in the first tab of the first menu layer to indicate the second status of the second item is associated with the second user.

6. The method of claim 5 further comprising displaying the third icon adjacent the second item.

7. The method of claim 1, wherein a first subset of the first plurality of items is visible in the first menu layer and a second subset of the first plurality of items is not visible in the first menu layer until the first menu layer is scrolled.

8. The method of claim 7 further comprising displaying the first icon and an arrow in the first menu layer to indicate to a user to scroll to view one or more of the items in the second subset of items.

9. The method of claim 1, wherein the first status of the first item comprises an indication of one or more of a newly recorded program, a downloaded program, a downloaded content, a newly available content, a newly available channel, a newly available service, a program limit, a content limit, a program deletion, a warning for a program deletion, or a memory limit.

10. The method of claim 1 further comprising changing one or more properties of the first icon.

11. The method of claim 10, wherein the properties include an icon type, an icon color, conditions to display an icon, an icon shape or an icon type associated with one or more users.

12. The method of claim 1 further comprising displaying the first icon as one or more of a graphical image, a text animation, an audio sound or a video image.

13. The method of claim 1 further comprising selecting the first icon within the first menu layer to open a sub-menu layer associated with the first item.

14. The method of claim 1 further comprising displaying a second menu layer having a second tab within the guide menu, the second menu layer including a second plurality of items including one or more of a second plurality of selectable sub-menu layers or a second listing of a plurality of media programs.

15. The method of claim 14, wherein the first plurality of items of the first menu layer are not visible in the guide menu when the second plurality of items of the second menu layer are displayed.

16. The method of claim 15, wherein the first tab is displayed simultaneously with the second tab when the second plurality of items of the second menu layer are displayed.

17. The method of claim 14 further comprising simultaneously displaying the first icon in the first tab and a second icon in the second tab.

18. The method of claim 17, wherein the second icon is indicative of a second status of at least one of the items of the second plurality of items.

19. A method comprising:
   displaying a guide menu containing one or more layers;
   displaying a first icon associated with a first user in a first location within a first menu layer indicating the status of a first content item, the first menu layer including a second menu layer that is selectable within the first menu, the second menu layer having a list of one or more content items including the first content item, wherein the list is unseen in the first menu layer when the second menu layer is not selected;
   displaying a second icon associated with a second user within the first menu layer indicating the status of one or more of the first content item or a second content item; and
   displaying the first icon in a second location adjacent the first content item when the second menu layer is selected and the list is displayed within the first menu layer.

20. The method of claim 19 further comprising displaying the icons adjacent to or within at least one of a tab, a button, a menu item, or a selectable menu item associated with the first menu layer.

21. The method of claim 19 further comprising displaying one or more of the first icon or the second icon as one or more of a graphical image, a text, an animation, an audio sound or a video image.

22. The method of claim 19, wherein the first menu layer is at least one of a menu section, a guide menu, a user interface menu, a widget or a channel banner.

* * * * *